(12) United States Patent
Shen et al.

(10) Patent No.: US 11,104,078 B2
(45) Date of Patent: Aug. 31, 2021

(54) 3D PRINTING METHOD

(71) Applicant: ZHEJIANG UNIVERSITY, Hangzhou (CN)

(72) Inventors: Hongyao Shen, Hangzhou (CN); Xiaoxiang Ye, Hangzhou (CN); Qingyu Li, Hangzhou (CN); Jianzhong Fu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 33 days.

(21) Appl. No.: 16/309,248

(22) PCT Filed: May 16, 2018

(86) PCT No.: PCT/CN2018/087057
§ 371 (c)(1),
(2) Date: Dec. 12, 2018

(87) PCT Pub. No.: WO2019/062143
PCT Pub. Date: Apr. 4, 2019

(65) Prior Publication Data
US 2021/0221069 A1  Jul. 22, 2021

(30) Foreign Application Priority Data
Sep. 30, 2017 (CN) .......................... 201710919012.8

(51) Int. Cl.
*B29C 64/40* (2017.01)
*B33Y 50/02* (2015.01)
*B33Y 10/00* (2015.01)
*B29C 64/393* (2017.01)

(52) U.S. Cl.
CPC ............ *B29C 64/40* (2017.08); *B29C 64/393* (2017.08); *B33Y 10/00* (2014.12); *B33Y 50/02* (2014.12)

(58) Field of Classification Search
CPC ...................................................... B29C 64/40
See application file for complete search history.

*Primary Examiner* — Larry W Thrower
(74) *Attorney, Agent, or Firm* — Jiwen Chen; Jacobson Holman PLLC

(57) ABSTRACT

The present invention has disclosed a 3D printing method, comprising the following steps: (1) importing a model to be printed into the printing area; (2) a support unit in arrayed arrangement is provided at the lower part of the printing area; dividing the printing area where the model is located into supporting divisions in corresponding quantity according to arrangement of the support unit; (3) traversing each supporting division to obtain the lowest point on the model in the supporting division; set the target height value of each supporting unit; the target height value shall be no more than the height value of the lowest point; (4) hierarchically slicing of the model and establishment of hierarchical relationship to obtain a series of 2D contour lines in reference to intersection of plane with the model according to layer height; (5) proceeding with treatment of the supporting structure according to target height value of the supporting unit to deduct substituted part of supporting unit in the supporting structure; (6) defining runtime of supporting unit and velocity as required to reach the target height according to the time as required by the printer nozzle to reach the position of target height value of the supporting unit so as to make the printer nozzle and supporting unit top to reach the target height simultaneously; (7) controlling the operation of printer and supporting unit to complete printing of physical model according to calculations.

7 Claims, 6 Drawing Sheets

3D PRINTING METHOD

This is a U.S. national stage application of PCT Application No. PCT/CN2018/087057 under 35 U.S.C. 371, filed May 16, 2018 in Chinese, claiming priority of Chinese Application No. 201710919012.8, filed Sep. 30, 2017, all of which are hereby incorporated by reference.

FIELD OF THE INVENTION

The present invention is related to the 3D printing field, in particular to a 3D printing method.

BACKGROUND ARTS 3D printing is a technology on manufacturing of physical parts through accumulating materials by 3D printing equipment according to 3D CAD model as designed. 3D printing has enormous advantages over manufacturing of prototype and model due to its low cost in manufacturing of complicated parts and personalized customization. 3D printing has wide application in such fields as government, aerospace, national defense, medical equipment, high technologies, education and manufacturing industries. Generally speaking, 3D printing comprises the following 5 steps: 1) obtaining 3D model, 2) data format conversion, 3) slicing calculation, 4) printing route planning and 5) output to 3D printer.

Fused deposition modeling (FDM) is a 3D printing technology with the highest market share at present, which has such advantages as easy operation, environment friendship and open source technology. According to its working principle, the sliced hot melt material (ABS, PLA and wax) is fed into the hot melt nozzle by the wire feeder for heating and melting; meanwhile, the nozzle moves along the profile of lamination and filling trail of parts to extrude the melted material, and make it deposit at the designated position on the worktable for hardening and stacking on the bonding layer of previously shaped material to form the product model eventually.

As the printing principle of an FDM 3D printer is similar to simple "block building", the extruded plastic wire will suspend in the air to the extent of making it impossible for fusion when printing hollowed part of the model. The user is required to add a supporting structure below the hollowed part of the object model before slicing. Such supporting structures are printed by the printer as one part of object model. The supporting structure has a high impact on FDM shaping time and quality, which affect the development of FDM technology.

Presently, the study of FDM supporting technology mainly focuses on supporting algorithm and supporting materials; meanwhile, the purpose for development of new printing equipment to eliminate or minimize supporting structure is also the current direction of study. Supporting algorithm initially aims to solve the problem with generation area of supporting structure, then the supporting algorithm is expected to optimize the supporting structure thereafter to obtain the supporting structure of high strength and made with less material. The object of the study of supporting materials is to facilitate easy elimination of the supporting structure. The supporting materials are divided into two categories, namely stripped materials and water-soluble materials. Stripped materials are stripped manually or with nippers after printing; whereas water soluble materials are eliminated following treatments with corresponding solutions. Supporting materials can make it much easier for post treatment of model manufactured through the FDM. As a new printing equipment compared with traditional 3-axis printer, a 5-axis printer is provided with two additional rotary axes that has more freedom to select printing directions. In theory, it is possible to adjust the working face to the angle requiring no support so as to eliminate the supporting structure.

Presently, supporting algorithm cannot generate ideal supporting structure of high strength and made with less material. It is difficult to ensure the stability of supporting structure while reducing the number of supports, it is necessary to develop more intelligent methods. On the other hand, supporting materials cannot solve the problem with time consumption and waste of materials to the supporting structure, which require more nozzles for printing, and have more stringent requirements for printing precision. 5-axis printer is more complicated than traditional printing equipment in terms of control, and requires significant preliminary technical study as prerequisites. Therefore, it is impossible to plan for printing of any model.

In addition to aforesaid contents of study, some people in this field propose to use an external supporting structure to substitute original printing structure. If supporting parts as prepared in advance are the same or similar to the supporting structure of models to be printed, substitution of supporting structure with supporting parts during printing will be favorable for saving time and materials. For instance, the patent literature with the application No. of CN 104647753 A has disclosed a 3D printing method, and proposed a database for storage of supporting parts; supporting parts can be taken from the database, and placed on the pre-set position on the printer base plate for printing. Such method can solve the problem with 3D printing support of stereo lithography. However, it is not applicable to other 3D printing methods. For instance, if supporting parts are placed on the printer base plate in advance during FDM manufacturing process, the printer nozzle would be in collision with supporting parts placed in advance during printing of manufactured models by layers due to the stacking manufacturing mode of FDM.

SUMMARY OF THE INVENTION

The present invention provides a 3D printing method that can save materials and printing time.

A 3D Printing method, comprising the following steps:
(1) importing a model to be printed into a printing area;
(2) providing a support unit in an arrayed arrangement below the printing area; dividing the printing area where the model is located into a corresponding plurality of supporting divisions according to arrangement of the support unit;
(3) proceeding with traversal of each supporting division to obtain a lowest point on the model in the supporting division; setting a target height value of each supporting unit; the target height value shall be no more than a height value of the lowest point;
(4) proceeding with hierarchical slicing of the model and establishment of hierarchical relationship to obtain a series of 2D contour lines in reference to an intersection of plane with the model according to layer height; after that, proceeding with classified marking based on contour lines obtained to identify each characteristic area, including supporting structure area and physical model area; once completed, planning printing route according to features of each area and area characteristic parameters as set in advance;
(5) proceeding with treatment of the supporting structure according to target height value of the supporting unit to deduct substituted part of supporting unit in the supporting structure;

(6) defining runtime and velocity of the supporting unit as required to reach the target height according to the time as required by the printer nozzle to reach the position of the target height value of the supporting unit so as to make the printer nozzle and the supporting unit top to reach the target height simultaneously, and make sure that the top of all supporting units is always lower than the printer nozzle;

(7) controlling the operation of printer and supporting unit to complete printing of physical model according to calculations obtained in Step (5) and (6).

The present invention provides a supporting device for 3D printing. The device comprises a plurality of combined supporting units. The device is located below the shaping area of 3D printer to substitute the base plate of a 3D printer. Driven by the motor, aforesaid supporting units can reach the target position.

For any model, a supporting unit is available for combination of different supporting structures for substitution of original printed supports to reduce the number of supports according to a profile of the model to be printed and relative position of the supporting device; the upper monitor can calculate ascending time of the supporting unit according to operation parameters and target height of the printer as well as a velocity curve of the supporting unit as set in advance to prevent collision between the printer and the supporting device during coordination.

The supporting device aims to substitute a base plate of the 3D printer. The model is printed and manufactured on the upper surface formed by the supporting units. The supporting units are uniform in specification. An upper surface of the supporting units at an initial position can be spliced into an integral plane. Any supporting unit is free of any sharp or projected profile to prevent collision between the supporting unit and the printer nozzle. The supporting units shall have adequate rigidity to ensure the stability of a supporting structure.

According to the method of the present invention, the supporting structure formed by the supporting units aims to substitute most of supporting structures as automatically generated by 3D printing software so as to minimize supports. The 3D printer continues to print a few supports based on the supporting structure formed by the supporting units, and thereby constitute the supporting structure as required by the physical model.

The method according to the present invention is expected to further divide a printing space into a plurality of supporting areas according to a layout of the supporting units, and calculate an ascending height of the supporting units in each supporting area based on a profile of the model and relative position of the supporting device. The supporting units in the area where the model is located will ascend during printing to form an external supporting structure in substitution of the supports printed.

According to the method of the present invention, the ascending height of the supporting units is actually the target height, which is determined by the height of the lowest point of the model in each supporting area; the target height value is no more than the height value of the lowest point, and an operator can set a height allowance as per actual demands. The target height value equals to the height value of the lowest point minus height allowance.

According to the method of the present invention, the supporting structure for continuous printing on the upper surface of supporting units is provided with margins in horizontal direction along the boundary of the supporting area so as to prevent collision between the supporting structure as printed and the supporting units.

A profile of the printing model according to the method of the present invention refers to the profile on the side adjacent to the supporting device. It is applicable to change the precision of the profile as per actual demands. The relative position of the printing model and supporting device refers to the position of the printing model in correspondence to the original working point; whereas the original point of supporting device shall coincide with original working point of the printer.

According to the method of the present invention, prevention of collision between the printer and the supporting units actually aims to make sure that supporting units are below the working height of the printer during movement. In other words, the supporting units are below the height of the printer nozzle. The ideal case is that printer nozzle and the supporting units can move to the target height simultaneously. In other words, the supporting units can provide support in a timely manner when the printer nozzle reaches the target height.

According to the method of the present invention, the velocity curve of the supporting units is set in advance; the collision can be prevented on condition that moving velocity of the supporting units is always higher than the set ascending velocity of the printer in the direction Z before the target height is reached. As the time when the printer reaches the target height can be obtained based on movement parameters of the printer, the ascending time of the supporting units can be calculated from the velocity curve and target height of the supporting units.

The movement parameters of the printer as required by the method of the present invention comprises pre-set printing velocity of each part of the printer, a material length of printing layer and ascending velocity of printer in the direction Z.

The present invention applies the conception of discretization into 3D printing field. Once the model to be printed is imported into the upper monitor, the upper monitor shall divide the area where the model is located into discrete supporting areas according to the position and angle corresponding to the supporting device. Each supporting area corresponds to one supporting unit. The upper monitor calculates the target height of supporting units in each area for treatment of supporting structure and deduction of the volume substituted by supporting units. When the printer is in operation, the supporting units in each area will ascend to the target height; after that, the printer will continue to print on this basis to form integral supports and physical model. As the number of supported as required has been significantly reduced as compared with original supporting structure, it is favorable for minimization of material consumption and improvement of printing efficiency.

The upper monitor calculates ascending time of the supporting units according to movement parameters and target height of the printer as well as preset velocity curve of the supporting units. The supporting units are driven to the target height to prevent collision between the printer and supporting device during coordination when geometrical features requiring addition of supporting structure are printed. Furthermore, the upper monitor will analyze compression status of the separated model so as to make use of planned movement of the supporting units to realize auto separation of model from the supporting device upon completion of printing while protecting printing model from damages.

To achieve quick and efficient calculation as described in Step (6) in a preferred embodiment, specific procedures for determination of runtime of supporting units and running velocity as required to reach the target height based on the time as required by the printer nozzle to reach the position of target height of supporting units are stated as follows:

6-1: In Step (5), calculating a speed of the printer in vertical direction based on printer operation parameters including printing speed as set for each part of the printer as well as the length of printing layer and ascending speed;

6-2: setting the velocity curve of the supporting unit to make sure that running velocity of the ascending supporting unit exceeds the ascending velocity as set in vertical direction;

6-3: obtaining the ascending time of the supporting unit based on the time as required by the printer nozzle to reach the target height, velocity curve and target height value of the supporting unit to make the supporting unit and printer nozzle reach the position of target height simultaneously.

To prevent collision between ascending supporting units and printed parts, the printer will reserve allowance in horizontal direction along the boundary of each supporting area according to Step (4) and (5) in preferred embodiment.

The upper monitor aims to analyze the compression status when the model is separated so as to realize auto release of the model from the supporting device upon completion of printing through planning for movement of the supporting unit while preventing printing model from damages. In a preferred embodiment, it further comprises the Step (8) in which, the area where the model is located is divided into numerous combinations of separation area and pushing area according to features of the model. Once the printing of model is completed, one combination of separation area and pushing area is selected to divide the area where the model is located. The supporting unit in the pushing area will move upwards to deviate from the separation area so as to ensure release of the model in the separation area. After that, the supporting unit in the pushing area will move back to the position before ascending. Then, another combination of separation area and pushing area to divide the area where the model is located is selected. The aforesaid process was repeated until traversal of all combinations of separation and pushing areas is completed for thorough release of model.

In a preferred embodiment, in Step (8), specific procedures for division of numerous combinations of the separation area and the pushing area in the area where the model is located according to features of the model are stated as follows:

8-1: calculating interfacial stress between the model and the supporting device when the supporting unit in each sub-area is pushed;

8-2: calculating the maximum deformational stress produced by separation of the model when supporting unit in each sub-area is pushed;

8-3: in the event that interfacial stress in any sub-area exceeds the critical value of interfacial stress, and the maximum deformational stress value is not over the critical deformation value of the model, the sub-area is deemed as the pushing area, and the remaining part of the area where the model is located is deemed as the separation area; the sub-area is the combination of more than one supporting areas where the supporting unit is located.

To improve separation effect, the combination of separation and pushing areas is selected as per interfacial stress in a sequence from big to small according to Step (8) in the preferred embodiment.

To ensure integrity of the model, in Step (8), velocity and stroke of supporting unit in the pushing area are divided into three categories as per deformational stress of the model as produced through calculation in Step 8-2 according to the preferred embodiment. A low-speed short stroke is selected for the maximum deformational stress and a low-speed long stroke is selected for medium deformational stress; and for the maximum deformational stress, the long stroke of maximum velocity is selected.

Beneficial effect of the present invention is stated as follows:

According to 3D printing method of the present invention, for any model, a supporting unit is available for combination of different external supporting structures for substitution of the original supports to be printed in a large quantity according to a profile of the model to be printed and relative position of the supporting device. Therefore, it can minimize waste of materials, shorten the processing time, and improve production efficiency. Meanwhile, it can also facilitate easy post treatment of substantial objects subjecting to 3D printing, and alleviate environmental pollution.

Figure 1:
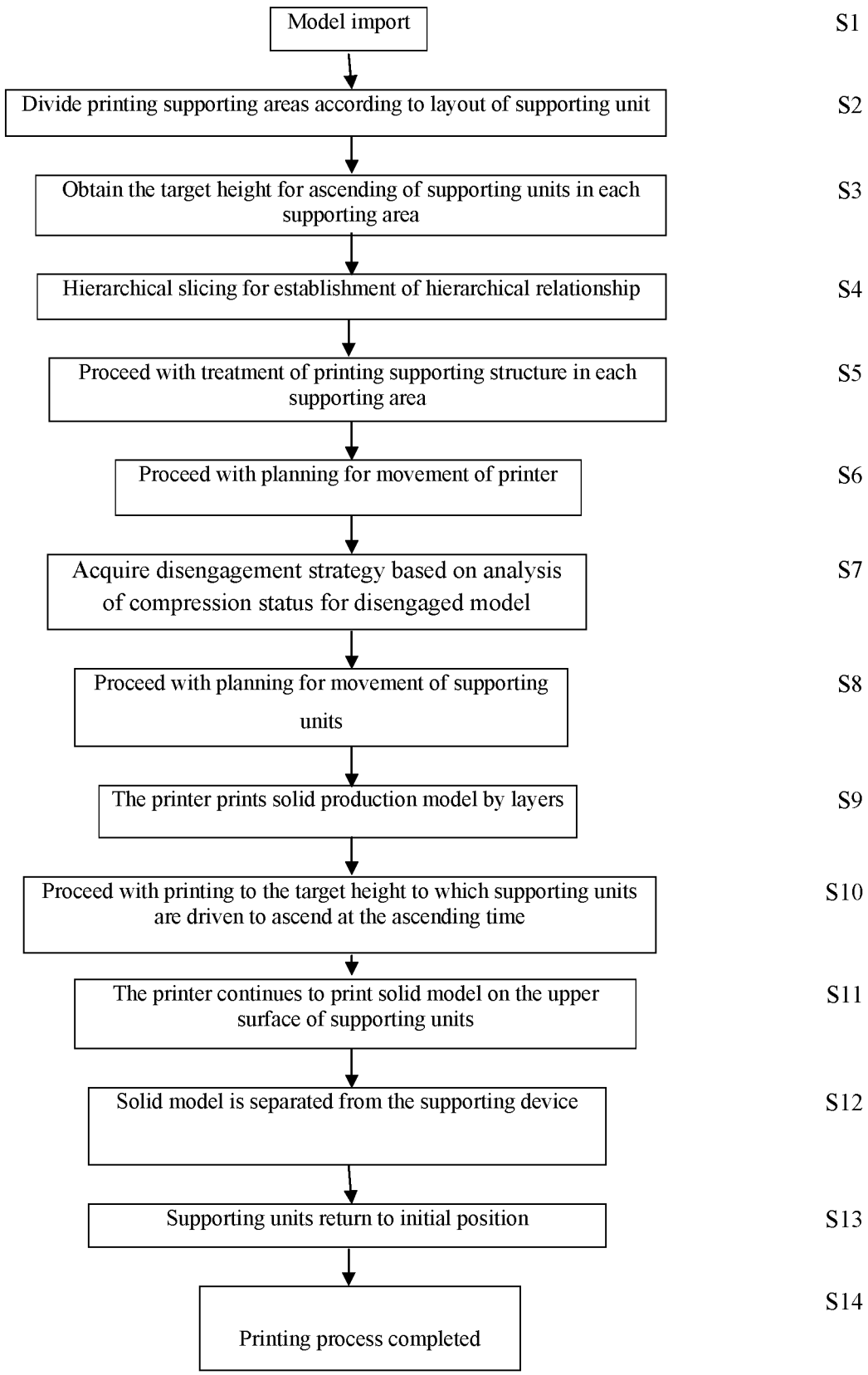
FIG. 1 is the flow chart for 3D printing method of the present invention.

The reference numerals: 100: supporting device; 110: supporting unit; 200: arch bridge model; 210: supporting structure to be printed continuously; 220: target height of supporting units in the supporting area; 300: supporting area; 400: cantilever model; 410: cantilever model during printing; 500: printer nozzle; 600: model to be separated after printing; 700: the area subjecting to maximum deformational stress at the time of separation; T: printing time T (ascending time of supporting unit to be printed to the cantilever structure); T': printing time T' (the time when cantilever structure is being printed); 110': supporting unit at time T'; 410': cantilever model that is being printed at time T'; 500': printer nozzle at time T'; s: separation area; p: pushing area.

PREFERRED EMBODIMENTS OF THE INVENTION

Figure 2:
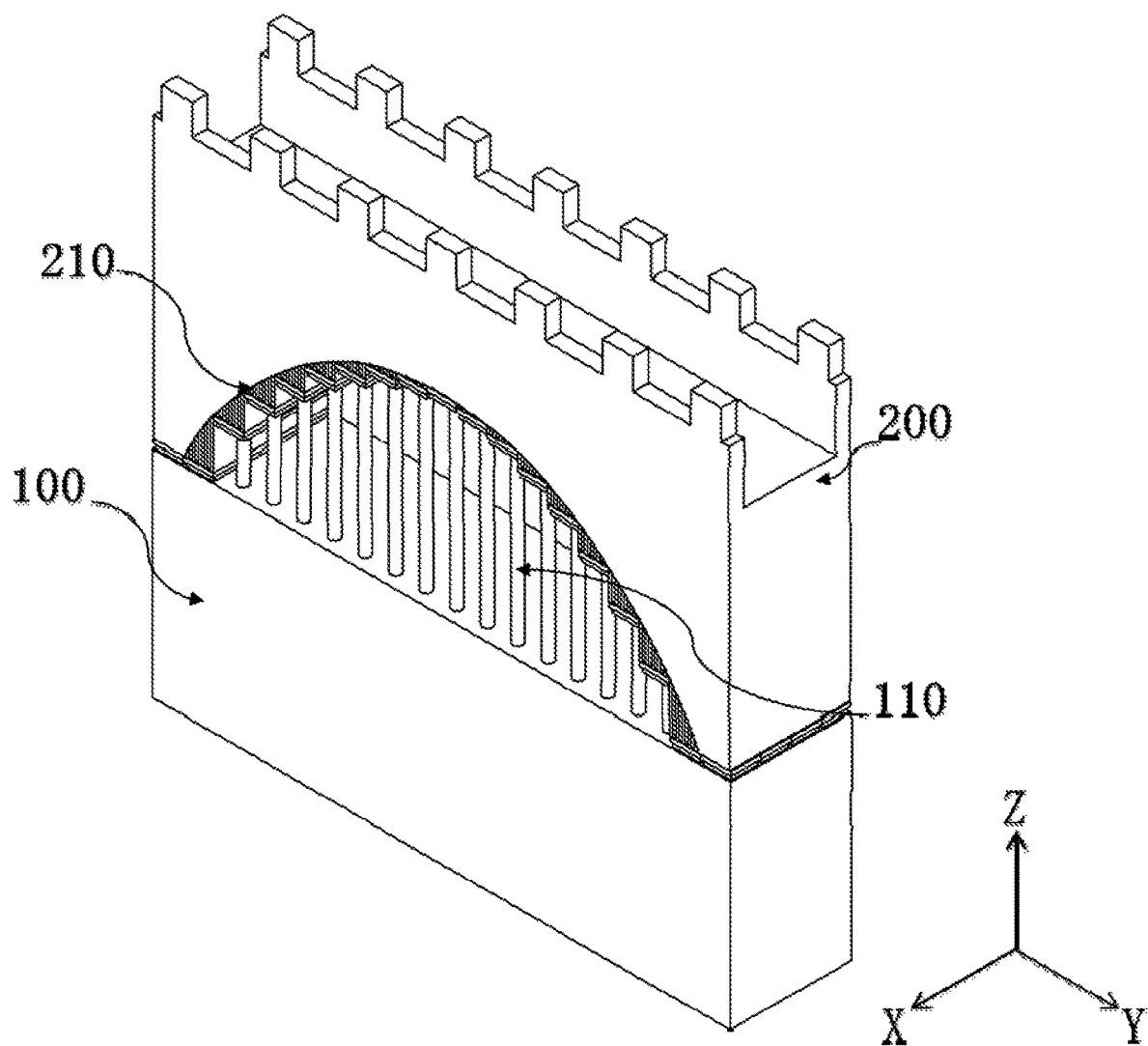
FIG. 2 is 3D structural diagram for the effect of arch bridge model printed on the supporting device with 3D printing method of the present invention.
Figure 5:
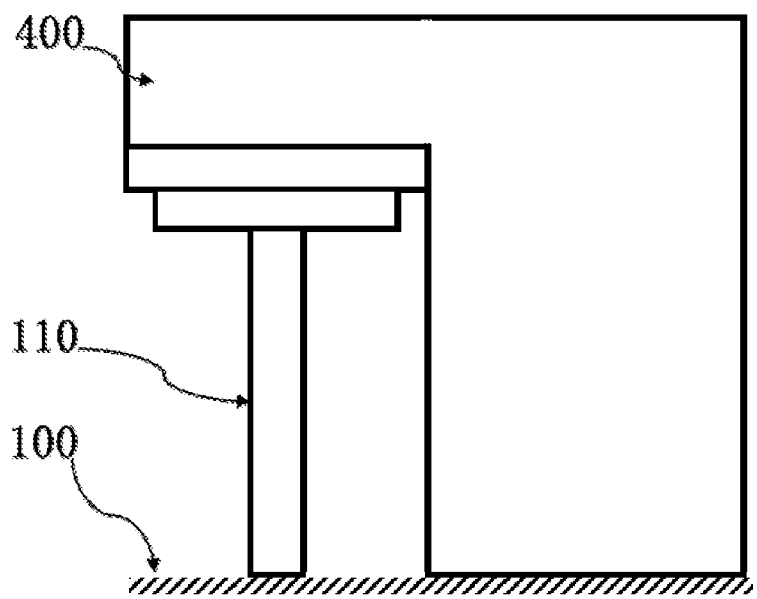
FIG. 5 is the diagram showing cantilever model and printing control process for prevention of collision between printer nozzle and supporting units (before support) during use of 3D printing method of the present invention.
Figure 6:
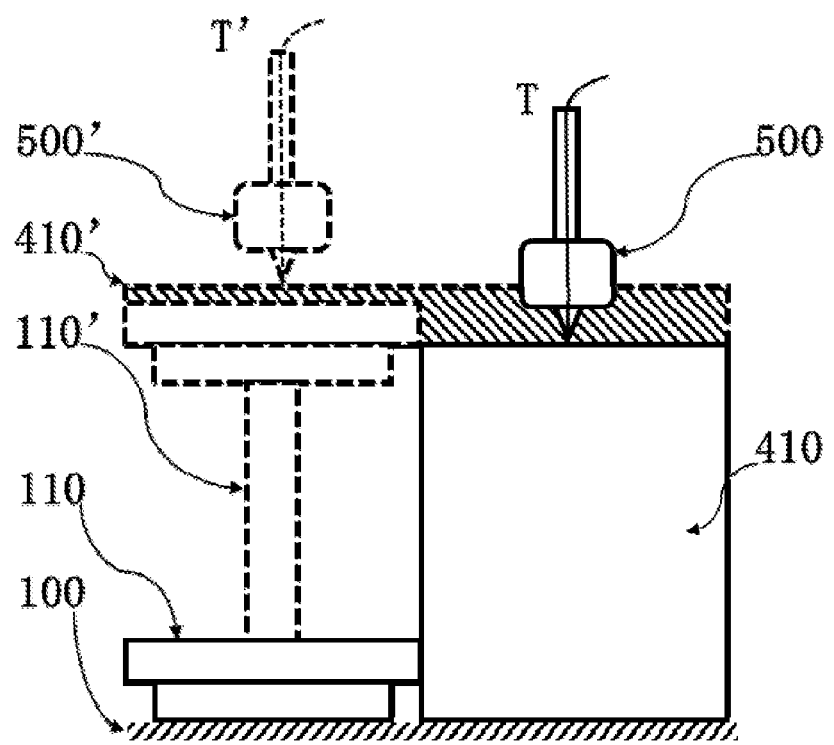
FIG. 6 is the diagram showing cantilever model and printing control process for prevention of collision between printer nozzle and supporting units (during support) during use of 3D printing method of the present invention.

As shown in FIGS. 1-8, 3D method in the embodiment comprises the following contents:

FIG. 2 is the axonometric drawing showing printing effect of the arch bridge model 200 manufactured according to the method in FIG. 1. When the arch bridge model 200 was printed and manufactured on the printer base plate with traditional methods, in view of a large-area hollowed part at the bridge opening, it was necessary to provide an adequate supporting structure at this part to prevent the hollowed part from collapsing due to the impact of gravity. The printed supporting structure was stripped and abandoned after printing to obtain the arch bridge model 200 as printed. A large quantity of supporting structures may result in waste of materials, extended printing time and low production efficiency. When the supporting device 100 according to this embodiment was used to facilitate printing, it was able to form the external supporting structure as shown in FIG. 2, significantly reduced the number of printed supports, minimized waste of materials, and improved printing efficiency. However, if the supporting unit 110 reaches the target height in advance, the printer nozzle 500 will collide with supporting unit 110 during printing and manufacturing by layers to the extent of resulting in failed printing. FIGS. 5 and 6 shows the printing control process provided by the embodiment for prevention of collision between printer nozzle and supporting units.

Please refer to the process as shown in FIG. 1 during practical printing and manufacturing of physical model with the method provided by the embodiment. The control method according to the embodiment aims to generate command for control. Step S1-S8 is realized in 3D printing control software.

The operator imported model at Step S1; the model was in existence in the format of 3D printed documents at this point. At this moment, it was necessary to confirm relative position of the printed model and the supporting device 100, namely the position of printed model corresponding to the original working point. The original point of supporting device 100 shall coincide with original working point of printer.

Figure 3:
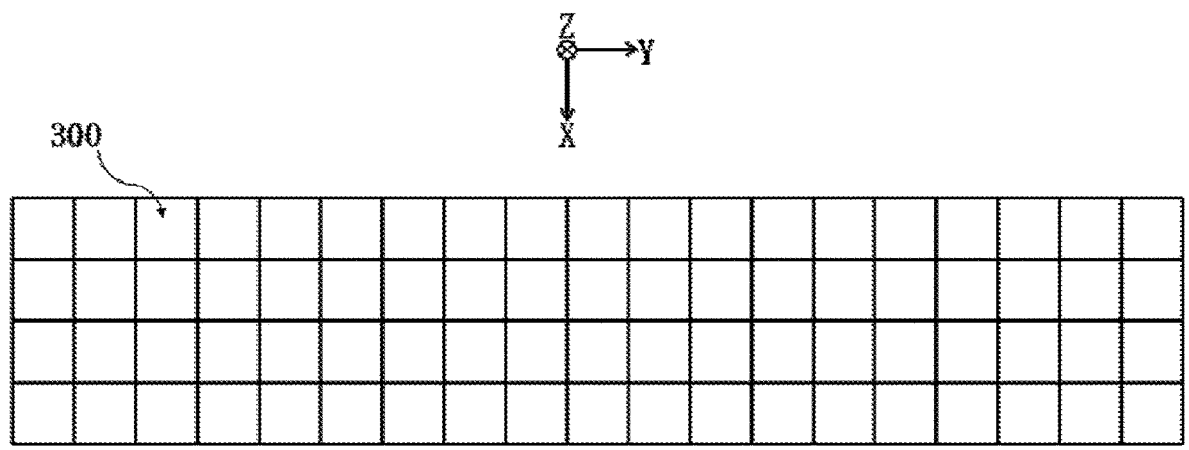
FIG. 3 shows supporting areas as divided in vertical projection direction in the area where the arch bridge model is located according to layout of supporting units.

After that, Step S2 divided the printing area where the model was located into numerous supporting areas 300 according to the layout of the supporting units 110. Each supporting area 300 corresponds to one supporting unit 110. Referring to FIG. 3, the printing area where the used arch bridge model 200 was located was divided into numerous supporting areas 300 in the direction of vertical projection. The follow-up operations were to be carried out by taking supporting area 300 as the unit.

In Step S3, it was necessary to proceed with traversal of each supporting area 300 to obtain the lowest point of model in this area. The height of this point was the maximum ascending height of corresponding supporting unit 110; whereas target height 220 was no more than the height of lowest point. The operator can set height allowance as per practical demands; as a result of it, target height value 220 was the height of lowest point of the model minus height allowance.

Step S4 aimed to proceed with hierarchical slicing of the model and establishment of hierarchical relationship to obtain a series of 2D contour lines in reference to intersection of plane with the model according to layer height. After that, classified marking based on contour lines obtained was conducted to identify each characteristic area, such as supporting structure area and physical model area. The follow-up printing route was planned according to area features and area characteristic parameters as set in advance.

Figure 4:
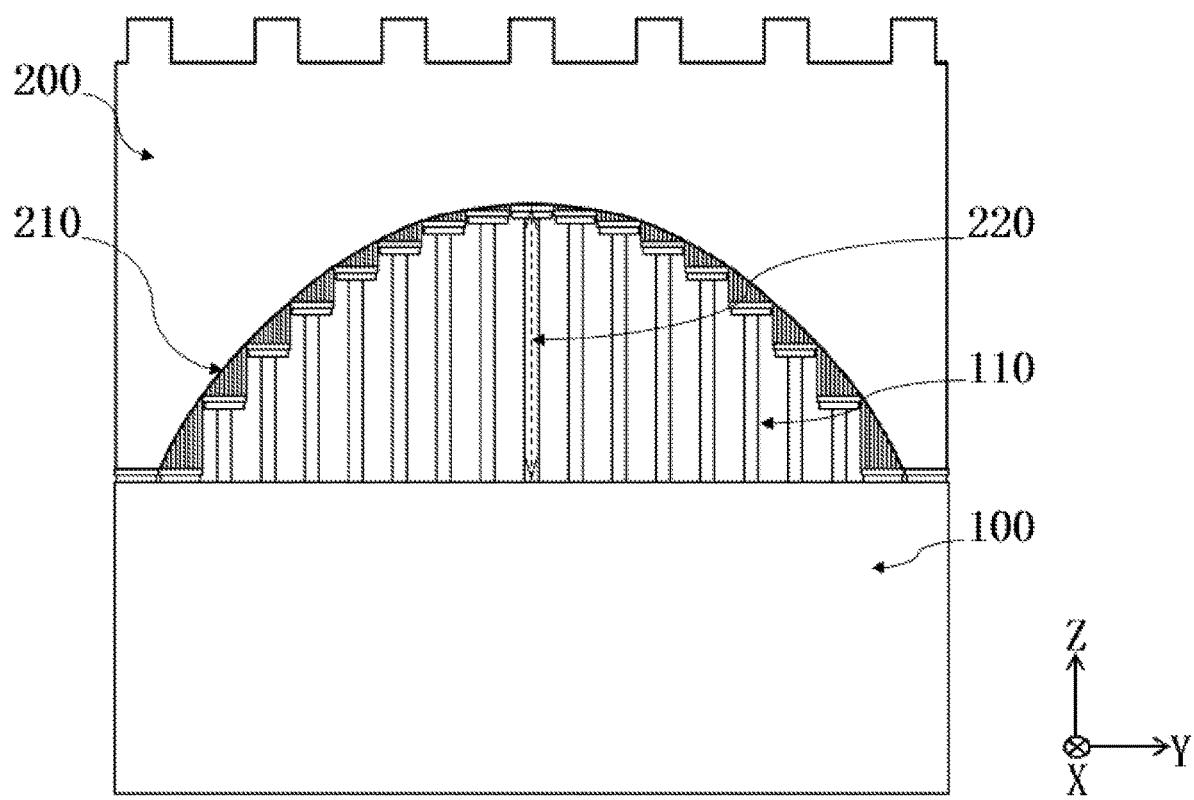
FIG. 4 is the front view showing effect of arch bridge model printed on the supporting device with 3D printing method of the present invention.

Step S5 is a process for calculation of identified supporting structure. As the external support formed through ascending of supporting unit 110 has substituted original supporting structure at this point, there was no need to print the support at this point. As the initial generation position of supporting structure in S4 was occupied by the printer base plate, Step S5 aimed to shift the initial generation position in each supporting area 300 to the target height 220 in the same area. Referring to FIG. 4, once the supporting units 110 in the printing area where the arch bridge model 200 was located ascended to the target height 220, the printer continued to print the supporting structure and the physical model on supporting unit 110. At this moment, the initial generation position of supporting structures in each supporting area 300 was shifted to target height 220 to eventually reduce the number of supports. In this step, it was necessary to reserve allowance in horizontal direction along the boundary of supporting area 300 in view of discrepancy between actual and theoretical positions during actual manufacturing process. If the allowance is not reserved, supporting structures as continuously printed at the boundary of supporting area 300 will over step the boundary to the extent of resulting in collision between supporting units 110 in adjacent area with overstepped supporting structures during ascending. Once the Step S5 was completed, the conversion of 3D documents for the model would be finished.

After that, Step S6 proceeded with planning of printer route for each characteristic area and supporting structure according to respective features and parameters, including printing velocity and discharge velocity. After that, working command for the printer was generated.

Step S7 aimed to analyze compression status of model in case of separation based on parameters of printing model and thrust force of supporting units, and sought the optimal disengagement strategy: Parameters of printing model include such information as profile, size, material of model and supporting area of model; such information was obtained by software in Step S2 and S4; whereas thrust force of supporting units was obtained through measurement in advance. Separation of model as stated herein referred to the that fact that the model was separated from the supporting device 100 by means of ascending dislocation of supporting units 110 after printing. Analysis of compression status covered stress when the model was separated and interfacial stress in case of contact between model and supporting device 100; analysis of the two situations aimed to prevent damages to fragile parts as resulted from separation, and sought the movement mode of supporting unit 110 that was the easiest for separation.

Figure 7:
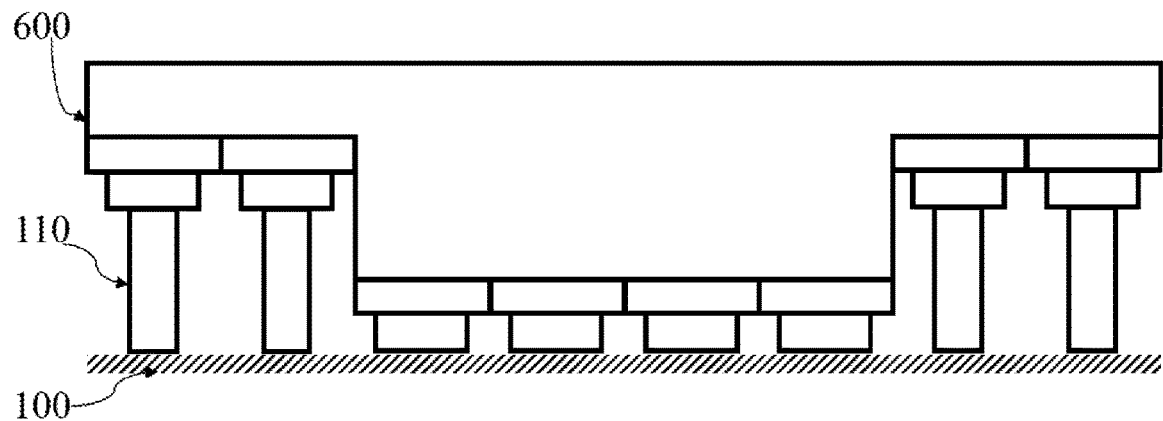
FIG. 7 is the diagram showing model separation mode (before pushing) with 3D printing method of the present invention.
Figure 8:
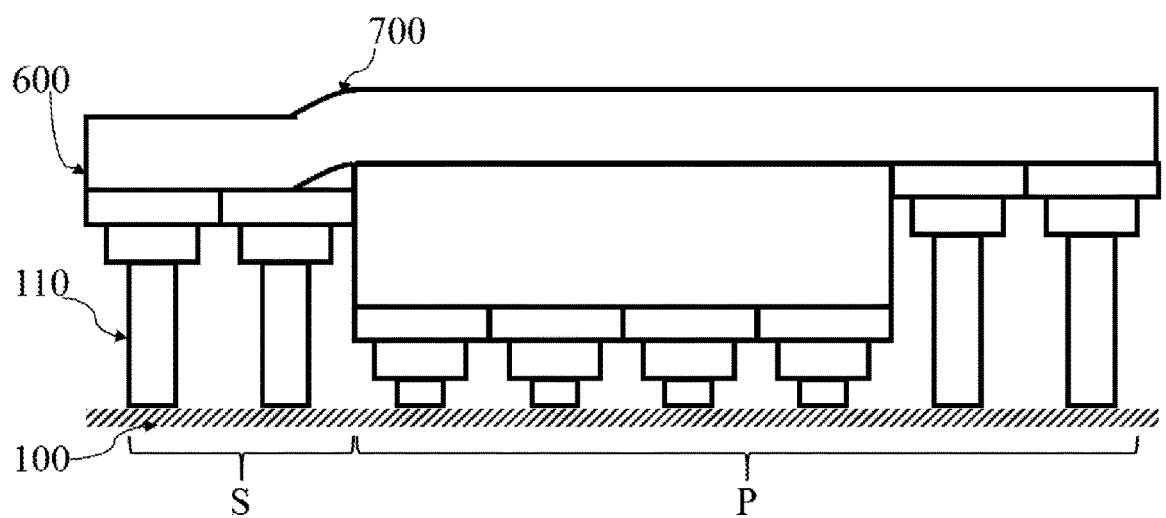
FIG. 8 is the diagram showing model separation mode (after pushing) with 3D printing method of the present invention.

The embodiment adopts the gradual separation method. Referring to FIGS. 7 and 8, the separation area S and pushing area P a were divided in the area where the model 600 was located at the time of each operation. The supporting unit 110 in pushing area P pushed model 600 to ascend, and makes use of stress produced by deformation to the model to damage the bonding surface between the model 600 and the supporting device 100 in separation area S, and realized separation of local models. After that, the supporting units 110 in the pushing area return to original position to complete one operation. Thereafter, each operation will be expected to re-divide the separation area S and the pushing area P. The pushing area ascended to make models in the separation area S separate, and return to original position.

The division of the separation area S and the pushing area P at each separation was obtained through compression analysis by the upper monitor: First, the software will proceed with conversion of the model structure to convert the complicated structure into a conventional one. Second, it will select at random more than one supporting area 300 corresponding to the supporting units 110 to form a sub-area to calculate the maximum interfacial stress between the model 600 and the supporting device 100 when the supporting unit 110 in the sub-area ascends as well as the maximum deformational stress of the model 600 at this moment. After that, when the maximum interfacial stress exceeded critical interfacial stress, and the maximum deformational stress was below the critical deformational stress, the sub-area would be an appropriate selection for pushing area P; whereas the remaining part would be separation area S. Finally, a series of feasible combinations of separation area S and pushing area P were obtained. Thus, separation area S and pushing area P were selected at each operation as per calculated interfacial stress in a sequence from big to small.

Meanwhile, the area 700 with the most serious deformation was the area subjecting to the most serious damages in case of separation of the model, where the maximum deformational stress may be produced. It is possible to prevent damages to the model through movement planning for supporting units in pushing area P according to the maximum deformational stress. The above mentioned critical values can be measured in advance.

Once the movement route of printer and model disengagement strategy were obtained, Step S8 would proceed with planning for the movement of supporting units. First, it managed to prevent collision between the printer nozzle 500 and the supporting unit 110 during operation through calculation of ascending time T of units. The specific method is stated as follows: In Step S6, movement parameters of printer, including printing velocity as set by the printer for each part, material length of printing layer, ascending velocity in the direction Z of the printer, were obtained. It is applicable to obtain the relationship between varied displacement and passing time in direction Z of the printer based on such parameters. Therefore, displacement to moving supporting unit 110 was always no more than displacement in direction Z of the printer, and the target height could be reached only at time T'. In this way, collision can be prevented. Aforesaid conditions serve as the basis for planning of movement route of supporting units. When the supporting unit 110 ascended, it was applicable to prevent supporting unit 110 from catching up with printer before it reached the target height on condition that moving velocity of the supporting unit 110 was always over the ascending velocity as set in direction Z. Such condition refers to mathematic reinforcement of basic conditions as stated in previous paragraph. In this embodiment, velocity curve of supporting units had been set with the help of software according to the reinforcement conditions. According to calculation based on movement parameters of the printer, the printer reached the target height at time T'. Therefore, it is applicable to deduce ascending time T of supporting units based on velocity curve of supporting units and target height.

Second, the supporting unit 110 would execute corresponding operations by steps to realize separation of model from supporting device 100 based on model disengagement strategy: The supporting unit 110 in pushing area P would ascend at each operation to complete separation of the model in the separation area S. After that, it would return to the position where the printing was completed to execute follow-up operation. The velocity and stroke of the supporting unit 110 were divided into three categories according to the maximum deformational stress produced by operation as recorded in Step S7. A low-speed short stroke was selected for higher stress and low-speed long stroke was selected for medium stress. If the stress can be neglected, the maximum velocity and long stroke were selected.

After that, Step S9 would proceed with combined output of commands from the printer and the supporting units to enter the practical printing stage for printing of physical model by layers. The rules stated herein were determined according to the conditions for connection of hardware of the printer and the supporting device 100: If series connection were used, just directly insert command from supporting device into that from printer; as printer commands were divided and arranged according to height, it only needed to insert commands from supporting device before the code of target height; if printer and supporting device 100 were mutually independent, it was necessary to add prompt command into the printer commands to indicate movement time T of the supporting unit 110. The commands for supporting device were sent accompanied by prompt command for processing by upper monitor.

The Step S10 was a specific printing control process for prevention of collision between the printer nozzle 500 and the supporting unit 110, which essentially aimed to make sure that the supporting unit 110 was below the working height of the printer during movement. In other words, the supporting unit 110 shall not exceed the height of the printer nozzle 500. Referring to FIG. 6, the ideal case was that the printer nozzle 500 and supporting unit 110 can move to the target height 220 simultaneously. The printer would print cantilever structure of cantilever model 410 at time T, and supporting unit 110 in this area would start to ascend. Furthermore, the printer was printing the cantilever structure of the cantilever model 410' at time T', and the supporting unit 110' had reached the target height 220 to provide support.

In Step S11, the printer would continue to print few supporting structures to constitute a complete support for the model and physical model based on the supporting structure formed by supporting units 110.

After that, Step S12 would separate physical model from supporting device 100 according to aforesaid separation strategy for gradual separation of model so as to obtain a complete model through simple processing.

Once completed, the supporting unit 110 in Step S13 would return to initial position on supporting device 100, and the motor would stop working.

Finally, the Step S14 was executed to complete printing.

When the method provided this embodiment was used for printing, it was necessary to provide the supporting device 100 to substitute original base plate of the printer. The model was printed and manufactured on the upper surface formed by the supporting units 110. The supporting units 110 were uniform in specification, of which the upper surface can be spliced into an integral plane, to make sure that there was not an excessive gap. The supporting unit 110 was free of any sharp or projected profile to prevent collision between the supporting unit and printer nozzle in case of construction of an external support. The supporting units 110 shall have adequate rigidity to ensure the stability of the supporting structure. Meanwhile, the supporting units 110 shall be controllable and provided with adequate movement precision to make sure that movement error will not affect the printing quality.

In conclusion, in this embodiment, for any model, the supporting unit 110 was available for combination of different external supporting structures for substitution of original supports to be printed in large quantity according to the profile of the model to be printed and relative position of the supporting device 100. Therefore, it can minimize waste of materials, shorten the processing time, and improve production efficiency. Meanwhile, it can also facilitate easy post treatment of substantial objects subjecting to 3D printing, and alleviate environmental pollution. Second, the upper monitor can calculate ascending time T of the supporting unit 110 according to operation parameters and target height of the printer as well as the velocity curve of the supporting unit 110 as set in advance to make sure that the supporting unit 110 is not higher than the printer nozzle 500, and prevent collision between the printer and the supporting unit 110 during coordination. Furthermore, the upper monitor will analyze compression status of separated model so as to make use of planned movement of the supporting units 110 to realize auto separation of the model from the supporting device 100 upon completion of printing while protecting the printing model from damages.

Finally, it should be noted that aforesaid embodiments are only expected to describe technical solutions of the present invention other than restriction; despite of the fact that the present invention has been described in details in reference to aforesaid embodiments, it should be understood by common technicians in this field that they still can alter the technical solutions as recorded in aforesaid embodiments, or proceed with equivalent substitution of partial or whole technical features; furthermore, such alterations or substitutions will not make corresponding technical solutions substantially deviate the scope of technical solutions as stated in embodiments of the present invention.

The invention claimed is:

1. A 3D printing method, characterized in that the method comprises the following steps:
   (1) importing a model to be printed into a printing area;
   (2) a support unit in arrayed arrangement being provided below the printing area, dividing the printing area where the model is located into supporting divisions in corresponding quantity according to arrangement of the support unit;
   (3) traversing each supporting division to obtain a lowest point on the model in the supporting division, setting a target height value of each supporting unit, the target height value being no more than a height value of the lowest point;
   (4) hierarchically slicing the model and establishing hierarchical relationship to obtain a series of 2D contour lines in reference to an intersection of a plane with the model according to layer height; after that, proceeding with classified marking based on contour lines obtained to identify each characteristic area, including a supporting structure area of a supporting structure and a physical model area;
   (5) proceeding with treatment of the supporting structure according to the target height value of the supporting unit to deduct a substituted part of supporting unit in the supporting structure;
   (6) defining runtime of the supporting unit and velocity as required to reach the target height according to a time as required by a printer nozzle to reach a position of the target height value of the supporting unit so as to make the printer nozzle and a supporting unit top to reach the target height simultaneously, and make sure that the top of all supporting units is always lower than the printer nozzle; and
   (7) controlling an operation of a printer and the supporting unit to complete printing of the physical model according to calculations obtained in the step (5) and step (6).

2. The 3D printing method according to claim 1, characterized in that specific steps for definition of runtime of the supporting unit and the velocity as required to reach the target height according to the time as required by the printer nozzle to reach the position of target height value of supporting unit in step (6) are stated as follows:
   6-1: in step (5), obtaining a speed of the printer in vertical direction based on printer operation parameters including printing speed as set for each part of the printer as well as the length of printing layer and ascending speed;
   6-2: setting the velocity curve of the supporting unit to make sure that running velocity of the ascending supporting unit exceeds the ascending velocity as set in vertical direction;
   6-3: obtaining the ascending time of the supporting unit based on the time as required by the printer nozzle to reach the target height, the velocity curve and the target height of the supporting unit to make the supporting unit and printer nozzle reach the position of the target height simultaneously.

3. The 3D printing method according to claim 1, characterized in that in step (4) and step (5), the printer reserves the margin in horizontal direction along the boundary of each supporting area during printing.

4. The 3D printing method according to claim 1, characterized in that it further comprises the step (8) in which, the area where the model is located is divided into numerous combinations of a separation area and a pushing area according to features of the model; once the printing of model is completed, one combination of separation area and pushing area is selected to divide the area where the model is located; the supporting unit in the pushing area will move upwards to deviate from the separation area so as to ensure release of the model in the separation area; after that, the supporting unit in the pushing area will move back to the position before ascending; after that, selecting one combination of the separation area and the pushing area to divide the area where the model is located; repeating aforesaid process until traversal of all combinations of the separation and pushing areas is completed for thorough release of the model.

5. The 3D printing method according to claim 4, characterized in that in step (8), specific procedures for division of numerous combinations of the separation area and pushing area in the area where the model is located according to features of the model are stated as follows:
   8-1: calculating interfacial stress between the model and the supporting device when supporting unit in each sub-area is pushed;
   8-2: calculating the maximum deformational stress produced by separation of the model when supporting unit in each sub-area is pushed;
   8-3: in the event that interfacial stress in any sub-area exceeds the critical value of interfacial stress, and the maximum deformational stress value is not over the critical deformation value of the model, the sub-area is deemed as the pushing area, and the remaining part of the area where the model is located is deemed as the separation area; the sub-area is the combination of more than one supporting areas where the supporting unit is located.

6. The 3D printing method according to claim 5, characterized in that in step (8), the combination of the separation and pushing areas is selected as per interfacial stress in a sequence from big to small.

7. The 3D printing method according to claim 5, characterized in that in step (8), the velocity and stroke of the supporting unit in the pushing area is divided into three categories as per deformational stress of the model as produced through calculation in step 8-2; selecting a low-speed short stroke for a maximum deformational stress and selecting a low-speed long stroke for a medium deformational stress; for the maximum deformational stress, selecting a long stroke of maximum velocity.

\* \* \* \* \*